Dec. 23, 1941.  W. C. TRAUTMAN  2,266,921
FLOW CONTROL VALVE
Filed May 7, 1940
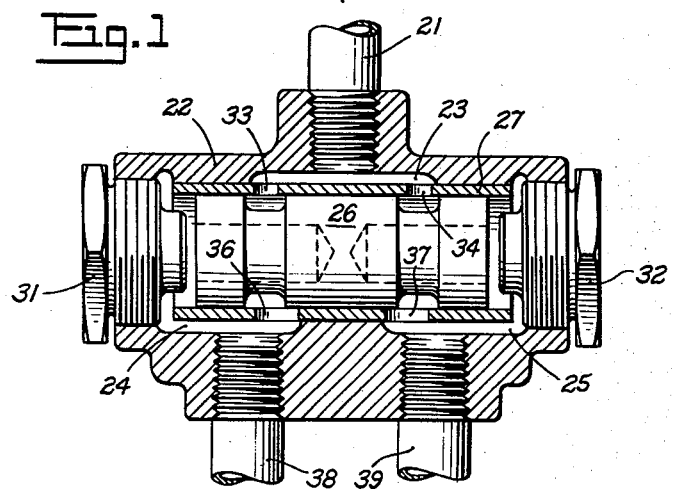
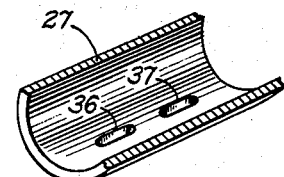
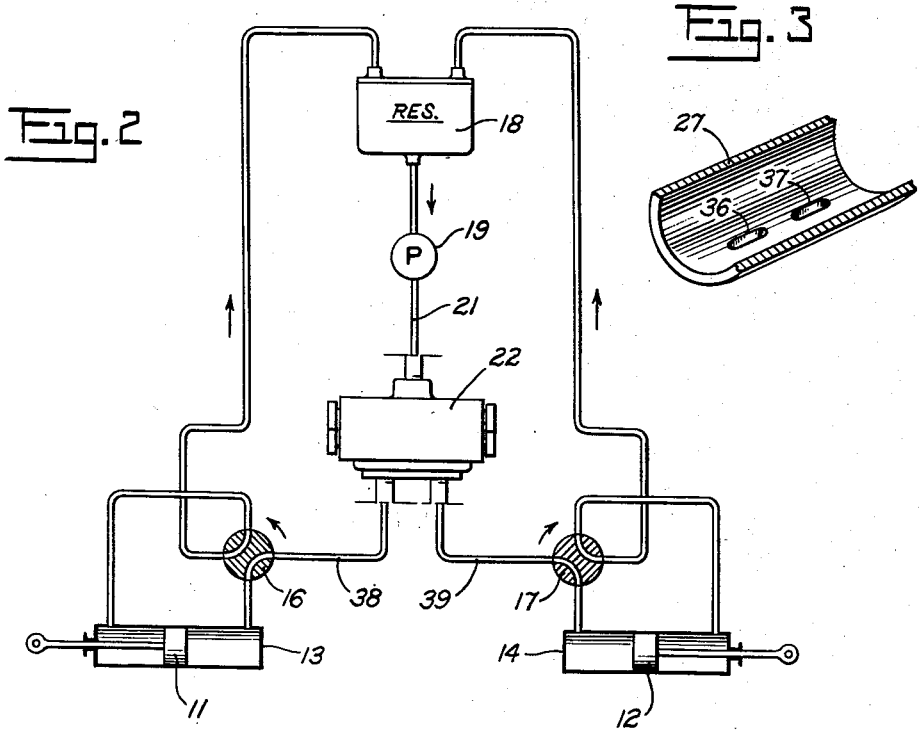
INVENTOR.
Walter C. Trautman
BY Martin J. Finnegan
ATTORNEY.

Patented Dec. 23, 1941

2,266,921

UNITED STATES PATENT OFFICE 2,266,921

FLOW CONTROL VALVE

Walter C. Trautman, Los Angeles, Calif., assignor to Bendix Aviation Corporation, South Bend, Ind., a corporation of Delaware Application May 7, 1940, Serial No. 333,870

2 Claims. (Cl. 137—166)

This invention relates to aircraft and particularly to the operation of aircraft control elements, such as flaps, elevators, stabilizers, landing gear, and the like.

When the herein-disclosed invention is applied to aircraft control elements, it provides a means of regulating the feeding of motive fluid to the actuating devices; the regulation being operative in such manner as to tend to produce the synchronous movement that is desirable if perfect control of the craft is to be maintained.

A specific object is to provide novel valve means for regulating the fluid flow; the valve being characterized by a capacity for self-adjustment, also by its inherent property of remaining in a flow-permitting position at all times, even when no flow is taking place therethrough. Another feature of the invention is the use of a valve so constructed as to provide a novel throttling action by which there is obtained a more sensitive regulating action; this novel throttling action being produced, in the embodiment illustrated, by the relative movement between a sharp-edged piston and a relatively long and narrow port or ports in the member along which the piston moves.

These and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

In the drawing:

Fig. 1 is a view, in longitudinal section, of a valve structure lending itself to the practice of the invention;

Fig. 2 is a schematic illustration of the invention as applied to hydraulic servo-units for actuation of aircraft controls, and incorporating the valve structure of Fig. 1; and Fig. 3 is a view in perspective of the lower half of one of the valve elements.

In Fig. 2 of the drawing, reference characters 11 and 12 designate pistons reciprocable in cylinders 13 and 14, respectively, to produce actuation of control units (not shown), and reference characters 16 and 17 designate valves for controlling the direction of fluid flow to and from said cylinders, thus controlling the direction of movement of servo-units 11, 12. The source of fluid (shown at 18) connects with valves 16, 17 by way of a suitable pump 19, a conduit 21, and the novel regulating valve above referred to.

As shown in Fig. 1, the regulating valve includes a housing 22 of generally cylindrical shape, with the inner cylindrical surface recessed to form an inlet port 23 and a pair of outlet ports 24 and 25, the ports being separated from the slidable element (piston) 26 of the valve by the intervening cylindrical sleeve 27, which lines the inner surface of the valve housing 22. Plugs 31 and 32 threadedly engage the opposite ends of housing 22 to close the latter, and serve as a means of ready access to the interior for inspection and clearing purposes.

In operation, fluid under pressure enters the inlet port 23 and divides to pass through the two holes 33, 34 in the liner 27. The fluid then flows along the two annular grooves on the piston proper and through the narrow, elongated slots 36, 37 in the other side of the liner, to enter the outlet ports 24, 25 and thus pass on (by conduits 38, 39) to the two operating cylinders whose motion is to be equalized.

In flowing through the elongated slots 36, 37, the fluid undergoes a certain amount of pressure drop due to the restrictive effect of these slots. Thus there is a pressure differential between the fluid at the ports 33, 34, on the one hand, and the fluid by-passed to the ends of the piston (through the passages leading to the chambers immediately adjacent the end plugs 31 and 32). It follows that, with fluid flowing in equal quantities to the cylinders, the drop through each elongated slot is the same, and the net pressure applied to each end of the piston is likewise the same; hence, the piston is maintained in balance as between the two elongated slots, so long as equal flow conditions obtain. However, should one cylinder tend to move faster than the other, thereby taking a greater flow of fluid, the pressure drop through that particular slot will be higher than on the other side, the net pressure then being lower. The net pressure applied to the end of the piston on that particular side will then be less than the opposing pressure from the opposite end of the piston. This differential in pressure will cause the piston to shift slightly in the direction of the port of the faster moving cylinder. This piston movement will cut down the slotted area in the liner leading to the fast moving piston, and correspondingly increase the opposite slotted area, thereby allowing a greater quantity of liquid to flow through this latter port, and thus tend ot equalize the motion of the operating cylinders by accelerating the slower unit sufficiently to synchronize with the faster unit.

Obviously, the action will produce the stated result regardless of which of the two units tends toward faster movement.

What is claimed is:

1. Valve means for equalizing fluid flow from a single source to a pair of fluid motors, said valve means including a housing having inlet and outlet ports, a cylinder lining the inner surface of said housing, said cylinder having long and relatively narrow passages extending so that their longest dimension runs longitudinally of said cylinder and registrable with said outlet ports and wider passages registrable with said inlet port, and pressure responsive means responsive to a difference between the pressure at one outlet port and the pressure at the other outlet port to vary the degree of flow through said narrow passages to said outlet ports.

2. Valve means for equalizing fluid flow from a single source to a pair of fluid motors, said valve means including an open-ended cylinder having a pair of relatively broad inlet and a pair of relatively narrow outlet passages, said narrow passages having their longest dimension running longitudinally of the cylinder, and means shiftable longitudinally of said cylinder for controlling the degree of flow through said outlet passages, said last-named means including a piston element having surfaces slidably contacting the inner surface of said cylinder, said surfaces terminating in relatively sharp, circular edges movable along said cylinder passages to regulate the degree of opening thereof, means for by-passing fluid from one of said outlet passages to one of the open ends of said cylinder, to act upon said piston element, means for by-passing fluid from the other of said outlet passages to the opposite open end of said cylinder, to act upon said piston element in the opposite direction, and a single unit housing both said by-passing means and enclosing the open ends of said cylinder.

WALTER C. TRAUTMAN.